US010348232B2

(12) United States Patent
Hsiao et al.

(10) Patent No.: US 10,348,232 B2
(45) Date of Patent: Jul. 9, 2019

(54) MOTOR SYSTEM WITH CURRENT SENSORLESS CONTROL AND METHOD OF CONTROLLING THE SAME

(71) Applicant: Delta Electronics, Inc., Taoyuan (TW)

(72) Inventors: Chih-Hung Hsiao, Taoyuan (TW); Yu-Wei Lee, Taoyuan (TW); Wei-Shuo Tseng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 16 days.

(21) Appl. No.: 15/689,927

(22) Filed: Aug. 29, 2017

(65) Prior Publication Data
US 2018/0287537 A1 Oct. 4, 2018

(30) Foreign Application Priority Data
Mar. 29, 2017 (CN) .......................... 2017 1 0198083

(51) Int. Cl.
*H02P 21/18* (2016.01)
*H02P 21/22* (2016.01)
*H02P 21/26* (2016.01)
*H02P 25/03* (2016.01)
*H02P 27/08* (2006.01)

(52) U.S. Cl.
CPC .............. *H02P 21/22* (2016.02); *H02P 21/18* (2016.02); *H02P 21/26* (2016.02); *H02P 25/03* (2016.02); *H02P 27/085* (2013.01); *H02P 2207/05* (2013.01)

(58) Field of Classification Search
CPC ................................. H02P 21/22; H02P 21/18
USPC .............................. 318/400.02, 400.01, 700
See application file for complete search history.

(56) References Cited

U.S. PATENT DOCUMENTS

| 5,955,861 A * | 9/1999 | Jeong | H02P 25/089 |
| | | | 318/400.09 |
| 6,462,491 B1 * | 10/2002 | Iijima | H02P 9/18 |
| | | | 318/400.09 |
| 9,154,061 B2 * | 10/2015 | Green | H02P 6/20 |

* cited by examiner

*Primary Examiner* — David Luo
(74) *Attorney, Agent, or Firm* — Hauptman Ham, LLP

(57) ABSTRACT

A motor system with a current sensorless control includes a motor, a drive module, and a motor control module. The motor control module controls the motor to rotate through the drive module. The motor control module includes a command generation module, a command conversion module, and an angle generation module. The command generation module generates speed information and transmits the speed information to the angle generation module, and the command generation module generates a voltage command and transmits the voltage command to the command conversion module. The angle generation module generates an electrical angle. The command conversion module converts the voltage command and the electrical angle into a control signal. The motor control module adjusts a phase of a motor input voltage to meet a phase of a motor input current according to the control signal.

15 Claims, 12 Drawing Sheets

MOTOR SYSTEM WITH CURRENT SENSORLESS CONTROL AND METHOD OF CONTROLLING THE SAME

BACKGROUND

Technical Field

The present invention relates to a motor system with a current sensorless control and a method of controlling the same, and more particularly to a motor system and a method of controlling the same for constant loads without using current sensors.

Description of Related Art

A permanent magnet synchronous motor (PMSM) mainly includes a plurality of form-wound stators and a rotor arranged around the stators. In general, the PMSM is controlled to adjust an input voltage of the PMSM by a motor control module by detecting an input current thereof, thereby controlling a phase of the input voltage and that of the input current of the PMSM are in phase.

Refer to FIG. 1A and FIG. 1B, which show schematic circuit block diagrams of a conventional motor with a power factor correction (PFC) control and a field oriented control (FOC), respectively. As shown in FIG. 1A, the PFC control manner is commonly used to control the sinusoidal-wave driven PMSM. In addition, another common control manner—FOC is used to control the sinusoidal-wave driven PMSM as shown in FIG. 1B. As shown in FIG. 1A and FIG. 1B, the motor control module 40A, 40B is provided to detect a motor input current Iin of the motor 60A, 60B through a current detection unit 50A, 50B, respectively. Accordingly, a control signal ScA, ScB is generated and transmitted to the drive module 20A, 20B according to the motor input current Iin and a position signal Sl of the motor 60A, 60B. The two control manners can both control and adjust the motor input voltage Vin and the motor input current Iin are in phase by feeding back the motor input current Iin under different loads 80A, 80B driven by the motor 60A, 60B so that a phase of the back-emf (back electromotive force) of the PMSM is closer or identical to that of the motor input current Iin, thereby maximizing the output torque and output efficiency of the motor 60A, 60B.

However, the current sensors cannot be used in the motor system once the costs and/or occupied hardware space of motor control module is considered. The phase of the back-emf (back electromotive force) of the PMSM is not closer to that of the motor input current Iin so that the motor 60A, 60B fails to maximize the output torque and output efficiency under the same input voltage. Accordingly, the present invention provides a motor system with a current sensorless control and a method of controlling the same to maximize output performances in the reduction of the occupied hardware space and costs of the motor system.

SUMMARY

In order to solve the above-mentioned problems, the present invention provides a motor system with a current sensorless control. Accordingly, the motor system with the current sensorless control includes a motor, a drive module, and a motor control module. The drive module is electrically connected to the motor. The motor control module is electrically connected to the motor and the drive module, and the motor control module controls the motor to rotate through the drive module. The motor control module includes a command generation module, a command conversion module, and an angle generation module. The command generation module receives a position signal and a speed command of the motor. The command conversion module is connected to the command generation module, and the command conversion module outputs a control signal to the drive module. The angle generation module is connected to the command generation module and the command conversion module, and the angle generation module receives the position signal. The command generation module generates speed information according to the position signal and transmits the speed information to the angle generation module, and the command generation module generates a voltage command according to the position signal and the speed command and transmits the voltage command to the command conversion module. The angle generation module generates an electrical angle according to the position signal and the speed information. The command conversion module converts the voltage command and the electrical angle into the control signal. The motor control module adjusts a phase of a motor input voltage to meet a phase of a motor input current according to the control signal.

In one embodiment, the angle generation module includes an angle calculation unit and an angular displacement unit. The angle calculation unit receives the position information. The angular displacement unit receives the speed information. The angle calculation unit generates a reference angle according to the position information. The angular displacement unit acquires an angular displacement amount corresponding to the speed information according to an angular displacement chart. The angle generation module composes the reference angle and the angular displacement amount into the electrical angle.

In one embodiment, the angle generation module further includes an adder. The adder is connected to the angle calculation unit, the angular displacement unit, and the command conversion module, and the adder adds the reference angle and the angular displacement amount so that the electrical angle is composed.

In one embodiment, the command generation module includes a speed calculation unit and an error amplification unit. The speed calculation unit receives the position signal of the motor. The error amplification unit is connected to the speed calculation unit and the command conversion module. The speed calculation unit converts the position signal into the speed information. The error amplification unit amplifies a difference between the speed information and the speed command into the voltage command.

In one embodiment, the command conversion module includes a phase conversion unit and a pulse width modulation unit. The phase conversion unit receives the voltage command and the electrical angle. The pulse width modulation unit is connected to the phase conversion unit and the drive module. The phase conversion unit adjusts the voltage command into a phase command according to the electrical angle. The pulse width modulation unit converts the phase command into the control signal.

In order to solve the above-mentioned problems, the present invention provides a motor system with a current sensorless control. Accordingly, the motor system with the current sensorless control includes a motor, a drive module, and a motor control module. The drive module is electrically connected to the motor. The motor control module is electrically connected to the motor and the drive module, and the motor control module controls the motor to rotate through the drive module. The motor control module includes a command generation module, a command conversion module, an angle generation module, and a power detection. The command generation module receives a position signal and a speed command of the motor. The command conversion module is connected to the command generation module, and the command conversion module outputs a control signal to the drive module. The angle generation module is connected to the command generation module and the command conversion module, and the angle generation module receives the position signal. The power detection unit detects a power signal of the drive module to the angle generation module. The command generation module generates speed information according to the position signal and transmits the speed information to the angle generation module, and the command generation module generates a voltage command according to the position signal and the speed command and transmits the voltage command to the command conversion module. The angle generation module generates an electrical angle according to the position signal, the speed information, and the power signal. The command conversion module converts the voltage command and the electrical angle into the control signal. The motor control module adjusts a phase of a motor input voltage to meet a phase of a motor input current according to the control signal.

In one embodiment, the angle generation module includes an angle calculation unit, an angular displacement unit, and an error compensation module. The angle calculation unit receives the position information. The angular displacement unit receives the speed information. The error compensation module receives the speed information and the power signal. The angle calculation unit generates a reference angle according to the position information. The angular displacement unit acquires an angular displacement amount corresponding to the speed information according to an angular displacement chart. The error compensation module outputs an angle compensation amount according to the power signal and the speed information. The angle generation module composes the reference angle, the angular displacement amount, and the angle compensation amount into the electrical angle.

In one embodiment, the angle generation module further includes an adder. The adder is connected to the angle calculation unit, the angular displacement unit, the error compensation module, and the command conversion module, and the adder adds the reference angle, the angular displacement amount, and the angle compensation amount so that the electrical angle is composed.

In one embodiment, the error compensation module includes a steady state unit, a power calculation unit, and an angle compensation unit. The steady state unit receives the speed information. The power calculation unit receives the power signal. The angle compensation unit is connected to the steady state unit and the power calculation unit. The steady state unit acquires a steady state power amount corresponding to the speed information according to a speed-power curve chart. The power calculation unit converts the power signal into an instantaneous power amount. The error compensation module acquires a power error amount according to a difference between the steady state power amount and the instantaneous power amount. The angle compensation unit acquires the angle compensation amount corresponding to the power error amount according to a power displacement chart.

In one embodiment, the error compensation module further includes a subtractor. The subtractor is connected to the steady state unit, the power calculation unit, and the angle compensation unit, and the subtractor subtracts the steady state power amount from the instantaneous power amount to provide the power error amount.

In one embodiment, the command generation module includes a speed calculation unit and an error amplification unit. The speed calculation unit receives the position signal of the motor. The error amplification unit is connected to the speed calculation unit and the command conversion module. The speed calculation unit converts the position signal into the speed information. The error amplification unit amplifies a difference between the speed information and the speed command into the voltage command.

In one embodiment, command conversion module includes a phase conversion unit and a pulse width modulation unit. The phase conversion unit receives the voltage command and the electrical angle. The pulse width modulation unit is connected to the phase conversion unit and the drive module. The phase conversion unit adjusts the voltage command into a phase command according to the electrical angle. The pulse width modulation unit converts the phase command into the control signal.

In order to solve the above-mentioned problems, the present invention provides a method of controlling a motor system with a current sensorless control. Accordingly, the motor system includes a motor, a drive module, and a motor control module electrically connected to the motor and the drive module. The motor control module controls the motor to rotate through the drive module. The method includes steps of: (a) detecting a position signal of the motor by the motor control module and outputting a control signal to control the drive module; (b) adjusting the control signal according to an electrical angle by the motor control module when the motor control module receives a speed command and detect that the position signal is varied; and (c) adjusting a phase of a motor input voltage to meet a phase of a motor input current according to the control signal by the motor control module.

In one embodiment, the step (b) further includes a step of: (b1) outputting a voltage command from the motor control module according to a difference between the position signal and the speed command and adjusting the voltage command into the control signal according to the electrical angle.

In one embodiment, the step (b1) further includes a step of: (b2) generating a reference angle according to the position signal by the motor control module, acquiring an angular displacement amount corresponding to the position signal according to an angular displacement chart, and composing the reference angle and the angular displacement amount into the electrical angle.

In one embodiment, the step (a) further includes a step of: (a1) detecting a power signal of the drive module by the motor control module.

In one embodiment, the step (b) further includes a step of: (b1) outputting a voltage command from the motor control module according to a difference between the position signal and the speed command and adjusting the voltage command into the control signal according to the electrical angle.

In one embodiment, the step (b1) further includes a step of: (b3) generating a reference angle according to the position signal by the motor control module, acquiring an angular displacement amount corresponding to the position signal according to an angular displacement chart, and acquiring a steady state power amount corresponding to the speed information according to a speed-power curve chart.

In one embodiment, the step (b3) further includes a step of: (b4) acquiring a power error amount by the motor control module according to a difference between the steady state power amount and the power signal, acquiring an angle compensation amount corresponding to the power error amount according to a power displacement chart, and composing the reference angle, the angular displacement amount, and the angle compensation amount into the electrical angle.

It is to be understood that both the foregoing general description and the following detailed description are exemplary, and are intended to provide further explanation of the present invention as claimed. Other advantages and features of the present invention will be apparent from the following description, drawings and claims.

BRIEF DESCRIPTION OF DRAWING

The present invention can be more fully understood by reading the following detailed description of the embodiment, with reference made to the accompanying drawings as follows.

DETAILED DESCRIPTION

Figure 1A:
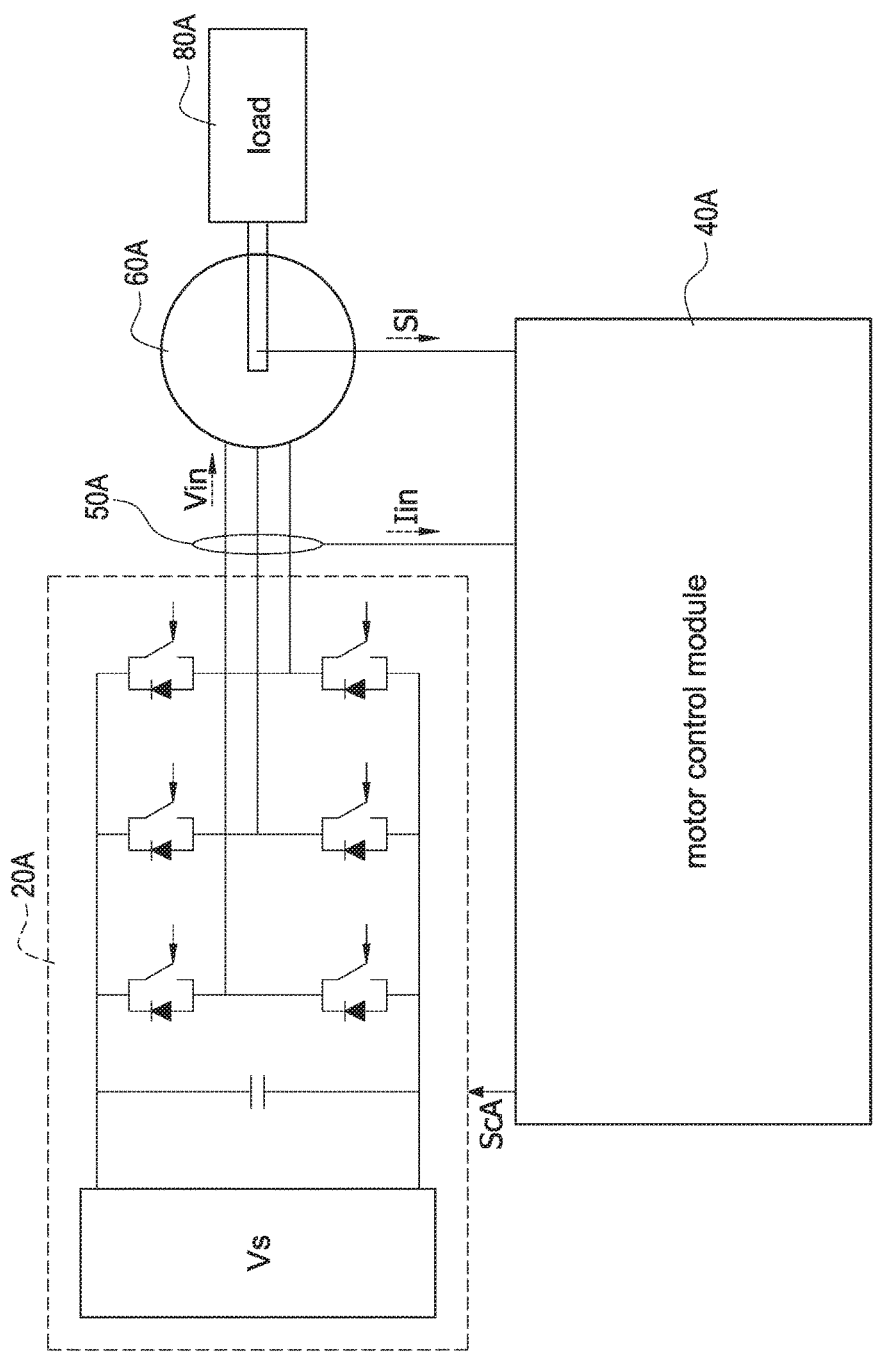
FIG. 1A shows a schematic circuit block diagram of a conventional motor with a power factor correction (PFC) control.
Figure 1B:
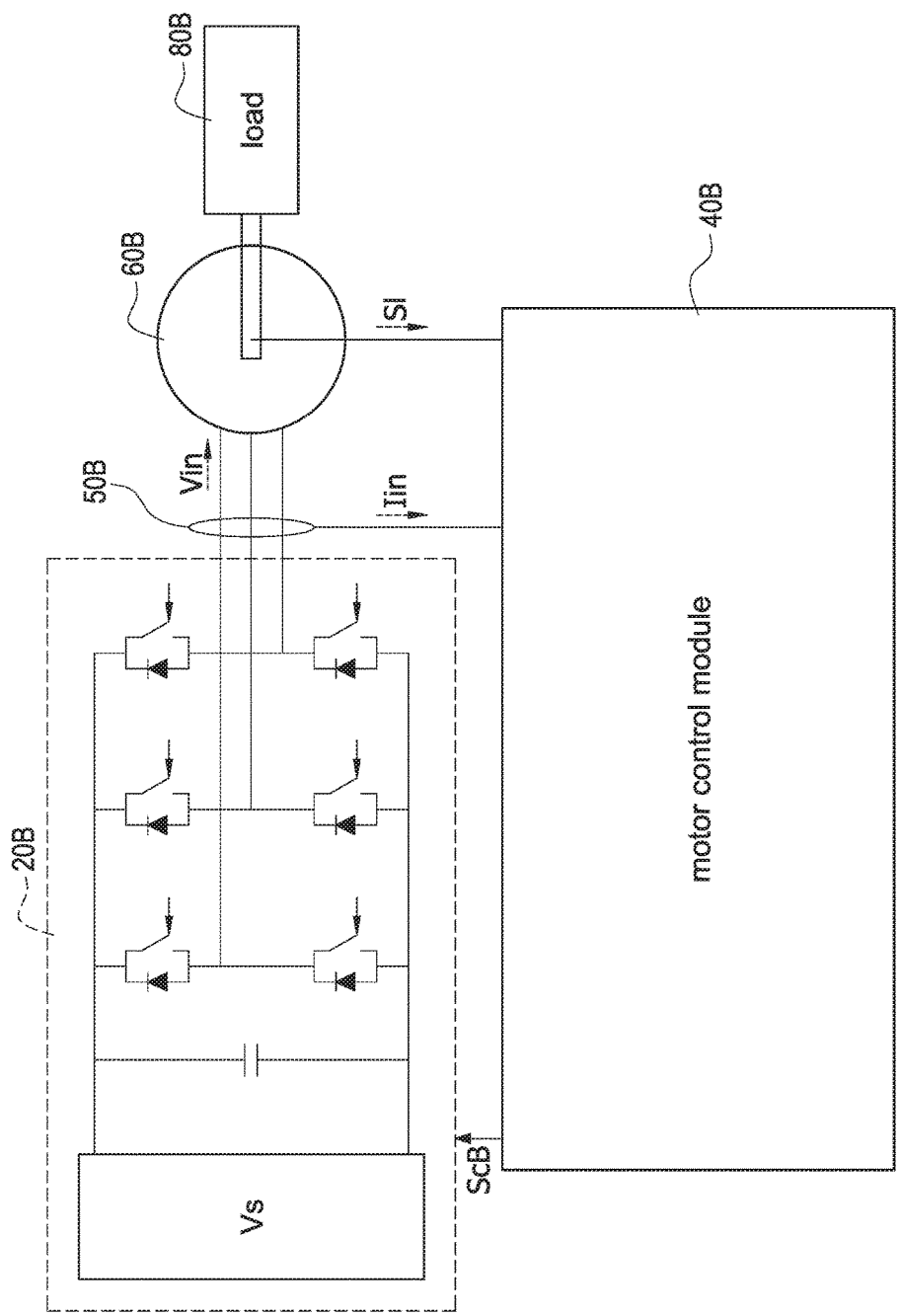
FIG. 1B shows a schematic circuit block diagram of a conventional motor with a field oriented control (FOC).

Reference will now be made to the drawing figures to describe the present invention in detail. It will be understood that the drawing figures and exemplified embodiments of present invention are not limited to the details thereof.

Figure 2:
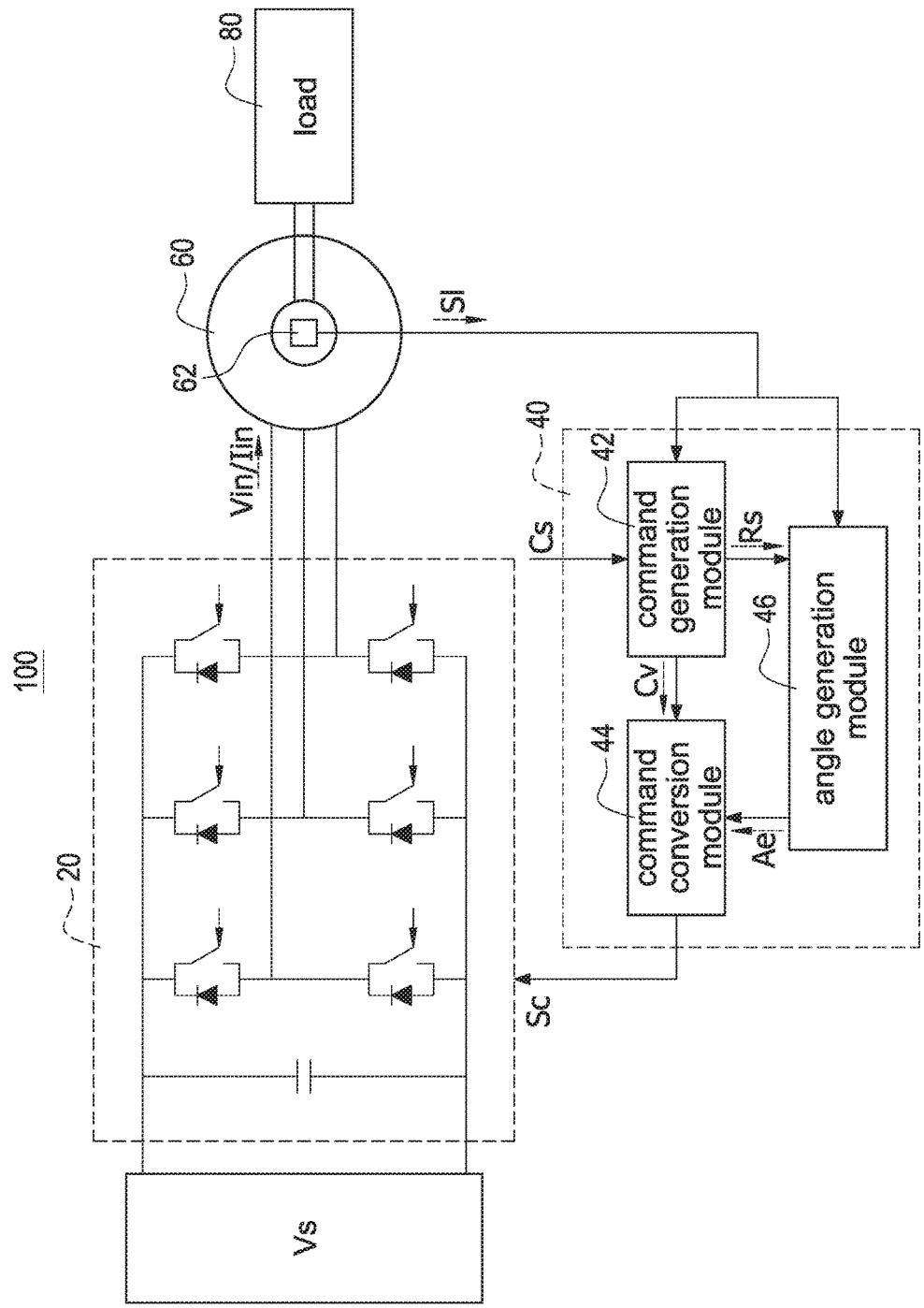
FIG. 2 shows a schematic circuit block diagram of a motor system according to the first embodiment of the present invention.

Refer to FIG. 2, which shows a schematic circuit block diagram of a motor system according to the first embodiment of the present invention. The motor system 100 includes a drive module 20, a motor control module 40, and a motor 60. The drive module 20 receives an input power source Vs and outputs a motor input voltage Vin. The motor 60 is electrically connected to the drive module 20 and receives the motor input voltage Vin. The motor control module 40 is electrically connected to the drive module 20 and the motor 60, and receives a position signal Sl of the motor 60 and outputs a control signal Sc to control the drive module 20. More specifically, the drive module 20 is a three-phase drive module including an input capacitor and three bridge arms connected in parallel to the input capacitor. In this embodiment, the motor 60 is a three-phase motor. Each bridge arm, which has an upper-arm switch and a lower-arm switch connected in series to the upper-arm switch, is connected to one phase of the motor 60. The motor 60 is connected to a load 80, and the load 80 may be a mechanical inertia load, such as an electric fan (hereinafter referred to as "fan"). The motor system 100 further includes a position detection unit 62 installed on the motor 60, and the position detection unit 62 is used to detect the position of the motor 60 and output the position signal Sl to the motor control module 40. The control signal Sc outputted from the motor control module 40 is composed of six PWM signals for correspondingly controlling the upper-arm switches and the lower-arm switches of the three bridge arms.

With reference also to FIG. 2, the motor control module 40 includes a command generation module 42, a command conversion module 44, and an angle generation module 46. The command generation module 42 and the angle generation module 46 are connected to a position detection unit 62 of the motor 60 to receive the position signal Sl. The command conversion module 44 is connected to the command generation module 42 and outputs the control signal Sc to the drive module 20. The angle generation module 46 is connected to the command generation module 42 and the command conversion module 44, and the angle generation module 46 is used to adjust (shift) a phase of the motor input voltage Vin according to the position signal Sl.

Moreover, the command generation module 42 receives the position signal Sl and a speed command Cs, and calculates a rotating speed (hereinafter referred to as "speed") according to the position signal Sl and outputs speed information Rs to the angle generation module 46. The command generation module 42 amplifies a difference between the speed information Rs and the speed command Cs into a voltage command Cv and outputs the voltage command Cv to the command conversion module 44. The angle generation module 46 generates an electrical angle Ae corresponding to the phase of the motor input voltage Vin according to the position signal Sl and the speed information Rs and transmits the electrical angle Ae to the command conversion module 44. The command conversion module 44 converts the voltage command Cv and the electrical angle Ae to output the control signal Sc to the drive module 20. When the position detection unit 62 detects the speed of the motor 60 is varied, the command generation module 42 adjusts the voltage command Cv to adjust the phase of the motor input voltage Vin of the motor 60 to meet a phase of a motor input current Iin of the motor 60, thus implementing PFC (power factor correction) and FOC (field oriented control) of the motor system 100. In one embodiment, the motor control module 40 may be implemented by a control chip or a physical circuit including the command generation module 42, the command conversion module 44, and the angle generation module 46.

Figure 3:
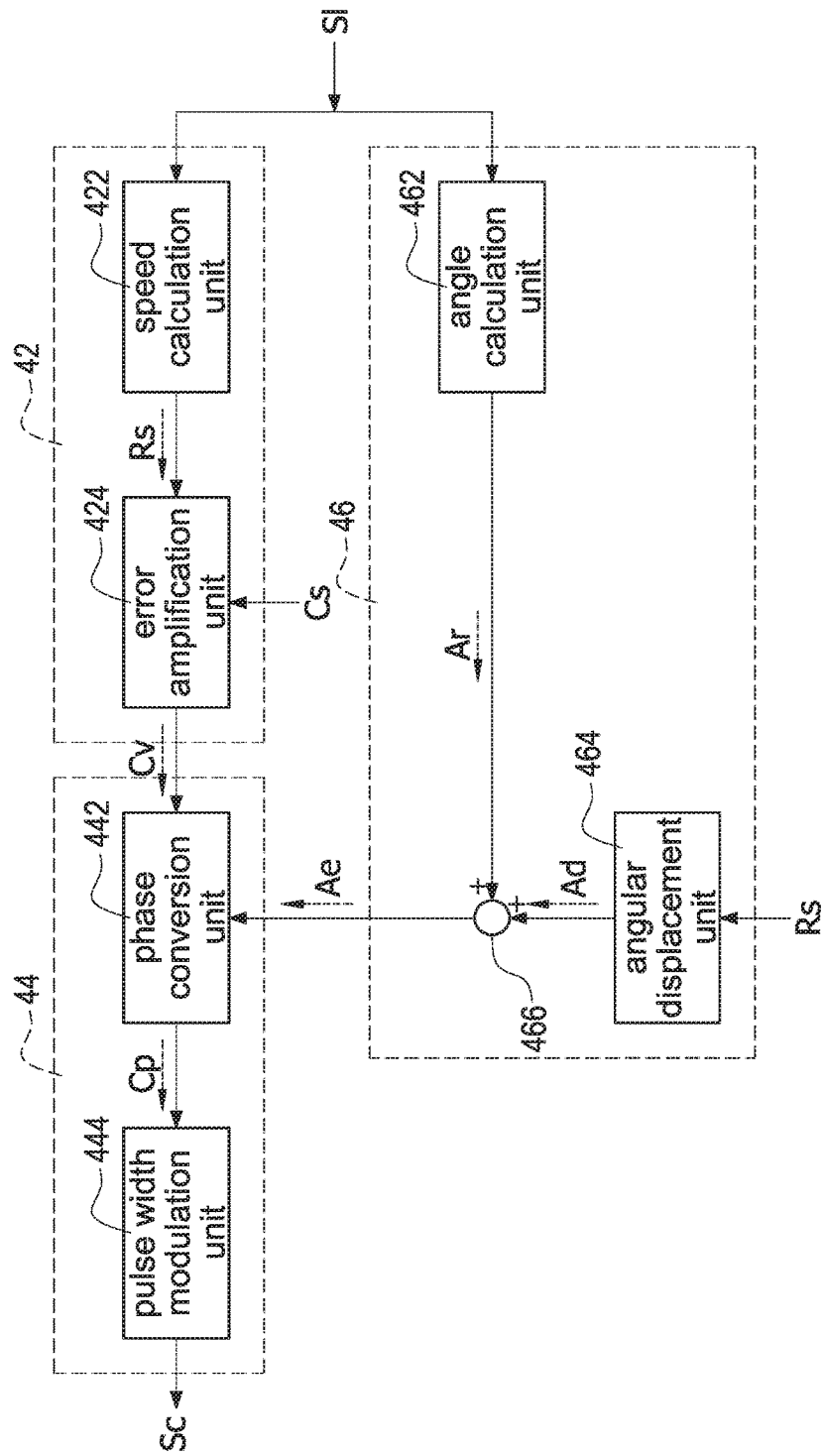
FIG. 3 shows a schematic circuit block diagram of a motor control module according to the first embodiment of the present invention.

Refer to FIG. 3, which shows a schematic circuit block diagram of a motor control module according to the first embodiment of the present invention. With reference also to FIG. 2, the command generation module 42 includes a speed calculation unit 422 and an error amplification unit 424. The speed calculation unit 422 is connected to the position detection unit 62 of the motor 60. The error amplification unit 424 is connected to the speed calculation unit 422 and the command conversion module 44. The speed calculation unit 422 receives the position signal Sl, calculates the speed of the motor 60 according to the position signal Sl, and outputs the speed information Rs. The error amplification unit 424 receives the speed information Rs and the speed command Cs, and amplifies an error value between the speed information Rs and the speed command Cs into an output error amplified value. The output error amplified value is used as the voltage command Cv.

The angle generation module 46 includes an angle calculation unit 462, an angular displacement unit 464, and an adder 466. The angle calculation unit 462 and the angular displacement unit 464 are connected to the command generation module 42 and the adder 466. The angle calculation unit 462 receives the position signal Sl, and calculates the position signal Sl to output a reference angle Ar as a synchronous angle of back-emf (back electromotive force) of the motor 60 to the adder 466. The angular displacement unit 464 has an angular displacement chart, and the angular displacement chart is, for example but not limited to, established by rules of experience. The angular displacement unit 464 receives the speed information Rs, acquires an angular displacement amount Ad corresponding to the speed information Rs according to the angular displacement chart, and outputs the angular displacement amount Ad to the adder 466. The adder 466 is connected to the angle calculation unit 462, the angular displacement unit 464, and the command conversion module 44. The adder 466 receives the reference angle Ar and the angular displacement amount Ad, and adds the reference angle Ar and the angular displacement amount Ad to compose the electrical angle Ae.

The command conversion module 44 includes a phase conversion unit 442 and a pulse width modulation unit 444 connected to the phase conversion unit 442. The phase conversion unit 442 is connected to the command generation module 42 and the angle generation module 46. The phase conversion unit 442 receives the voltage command Cv outputted from the command generation module 42, receives the electrical angle Ae outputted from the angle generation module 46, and adjusts and converts the voltage command Cv into three phase commands Cp displaced from one another by 120 electrical degrees according to the electrical angle Ae.

Figure 4:
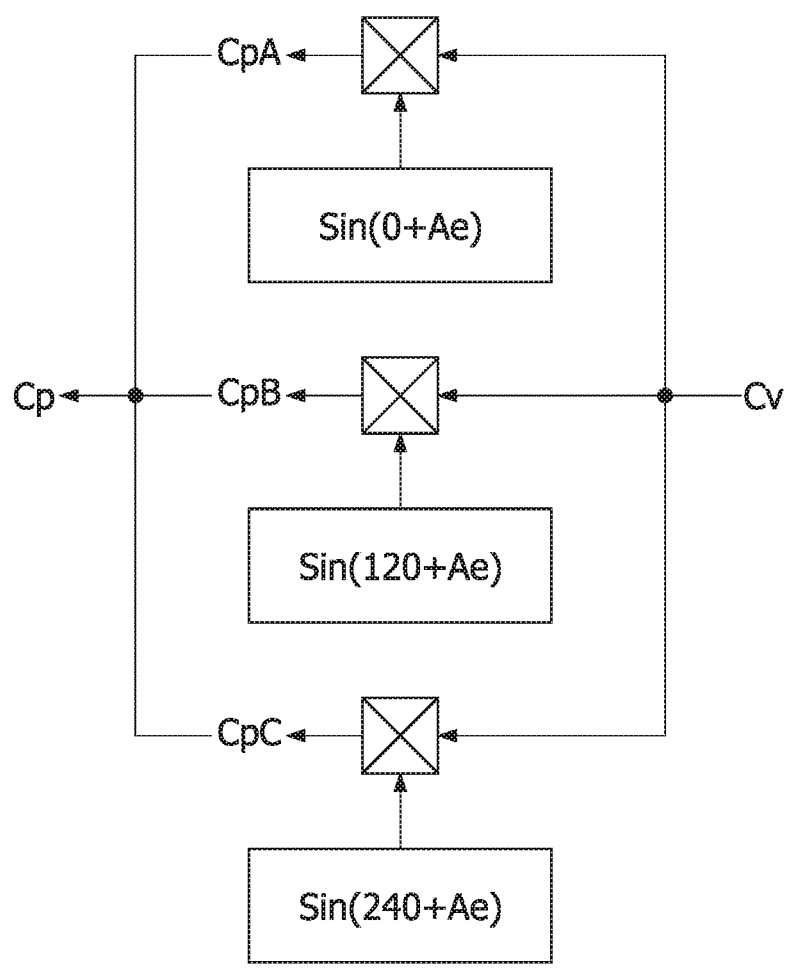
FIG. 4 shows a schematic circuit block diagram of a phase conversion unit according to the first embodiment of the present invention.

Refer to FIG. 4, which shows a schematic circuit block diagram of the phase conversion unit according to the first embodiment of the present invention. With reference also to FIG. 2 and FIG. 3, the phase conversion unit 442 divides the voltage command Cv into three sub-voltage commands displaced from one another by 120 electrical degrees. Each of the sub-voltage commands correspondingly adds the phase of the electrical angle Ae to acquire the three phase commands Cp (including CpA, CpB, CpC) displaced from one another by 120 electrical degrees, and the phase commands Cp are transmitted to the pulse width modulation unit 444. The pulse width modulation unit 444 is connected to the phase conversion unit 442 and the drive module 20. The pulse width modulation unit 444 receives the three phase commands Cp, converts the three phase commands Cp into the control signal Sc, and outputs the control signal Sc to the drive module 20 for controlling the upper-arm switches and the lower-arm switches of the three bridge arms of the drive module 20.

Figure 5:
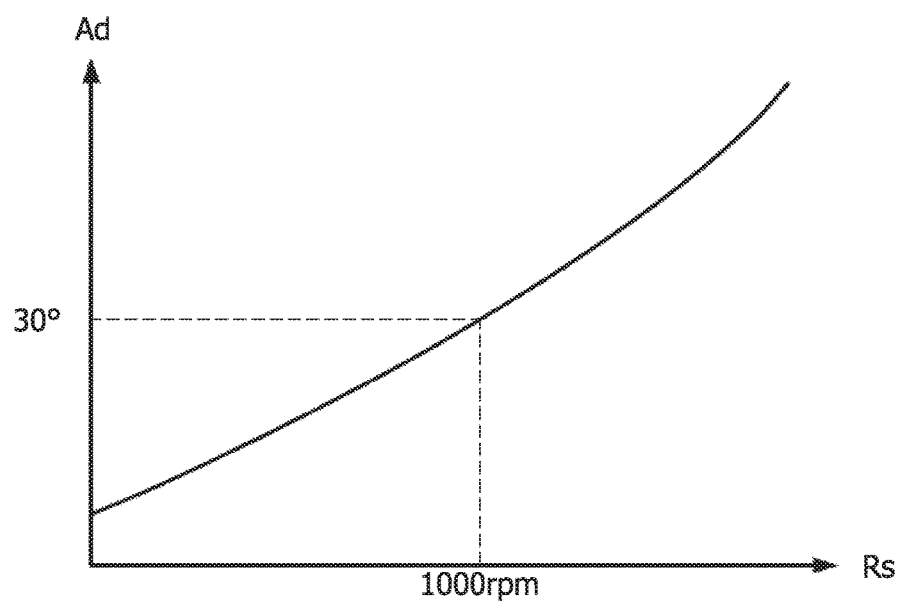
FIG. 5 shows a schematic chart of speed information versus an angular displacement amount of the present invention.

Refer to FIG. 5, which shows a schematic chart of speed information versus an angular displacement amount of the present invention. With reference also to FIG. 2 and FIG. 3, when the angular displacement unit 464 receives the speed information Rs, the angular displacement unit 464 acquires the angular displacement amount Ad corresponding to the speed information Rs according to the angular displacement chart. For example, when the speed information Rs is 1000 rpm, the angular displacement amount Ad corresponding to the speed information Rs is 30 degrees. In one embodiment, the angular displacement unit 464 has a memory unit (not shown) for storing the angular displacement chart. The angular displacement chart shown in FIG. 5 indicates different angular displacement amounts Ad corresponding to different speed values of the speed information Rs before the motor control module 40 is formally operated (namely in a test stage). More specifically, different angular displacement amounts Ad relative to different loads (for example, different fans), which are driven by the motor 60 controlled by the motor control module 40, are acquired during the test stage. Therefore, the angular displacement amount Ad can be acquired according to the speed of the motor 60 when the motor 60 is formally operated. In one embodiment, the memory unit (not shown) may be allocated inside the angular displacement unit 464 or outside and connected to the angular displacement unit 464.

Figure 6:
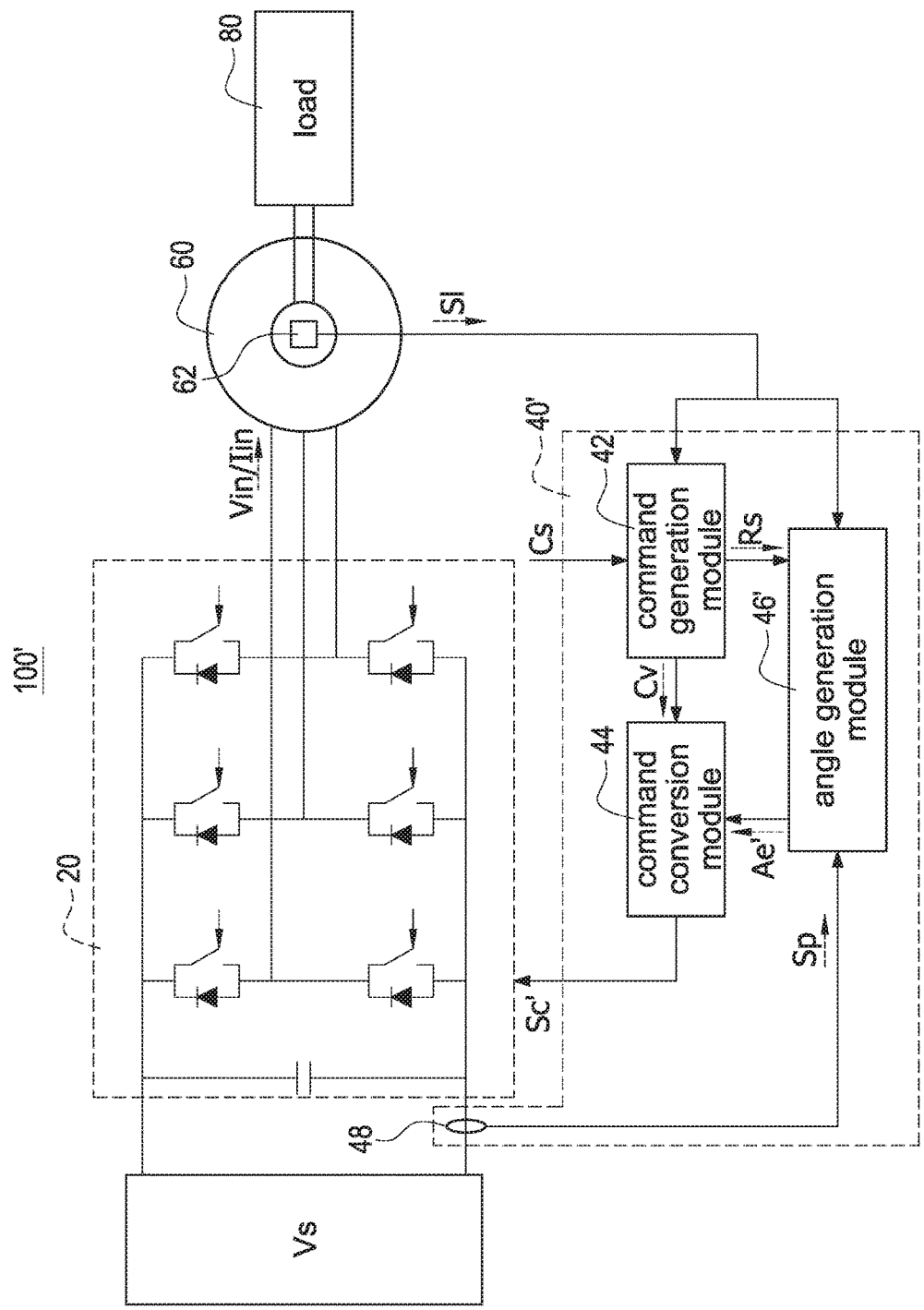
FIG. 6 shows a schematic circuit block diagram of the motor system according to the second embodiment of the present invention.

Refer to FIG. 6, which shows a schematic circuit block diagram of the motor system according to the second embodiment of the present invention. The major difference between the motor system 100' in the second embodiment and the motor system 100 in the first embodiment is that a motor control module 40' further includes a power detection unit 48. The power detection unit 48 is connected to the input power source Vs and the drive module 20. The power detection unit 48 is used to detect a power signal Sp of the drive module 20 to an angle generation module 46' of a motor control module 40'. In general, an additional acceleration is generated as the motor 60 suddenly accelerates. During the transient acceleration process, a curve of the speed information versus the angular displacement amount is deviated from the curve shown in FIG. 5 due to the generated larger instantaneous power. Accordingly, the power signal Sp needs to be detected to compensate the angular displacement of the motor 60 according to the detected power signal Sp during the transient acceleration process, thus accurately acquiring an electrical angle Ae'. In particular, the connection relationship between the command generation module 42 and the command conversion module 44 is identical to that in the first embodiment. In addition, the connection location between the power detection unit 48 and the drive module 20 is only exemplified, that is, other connection locations between the power detection unit 48 and the drive module 20 are intended to be embraced within the scope of the present invention.

Figure 7:
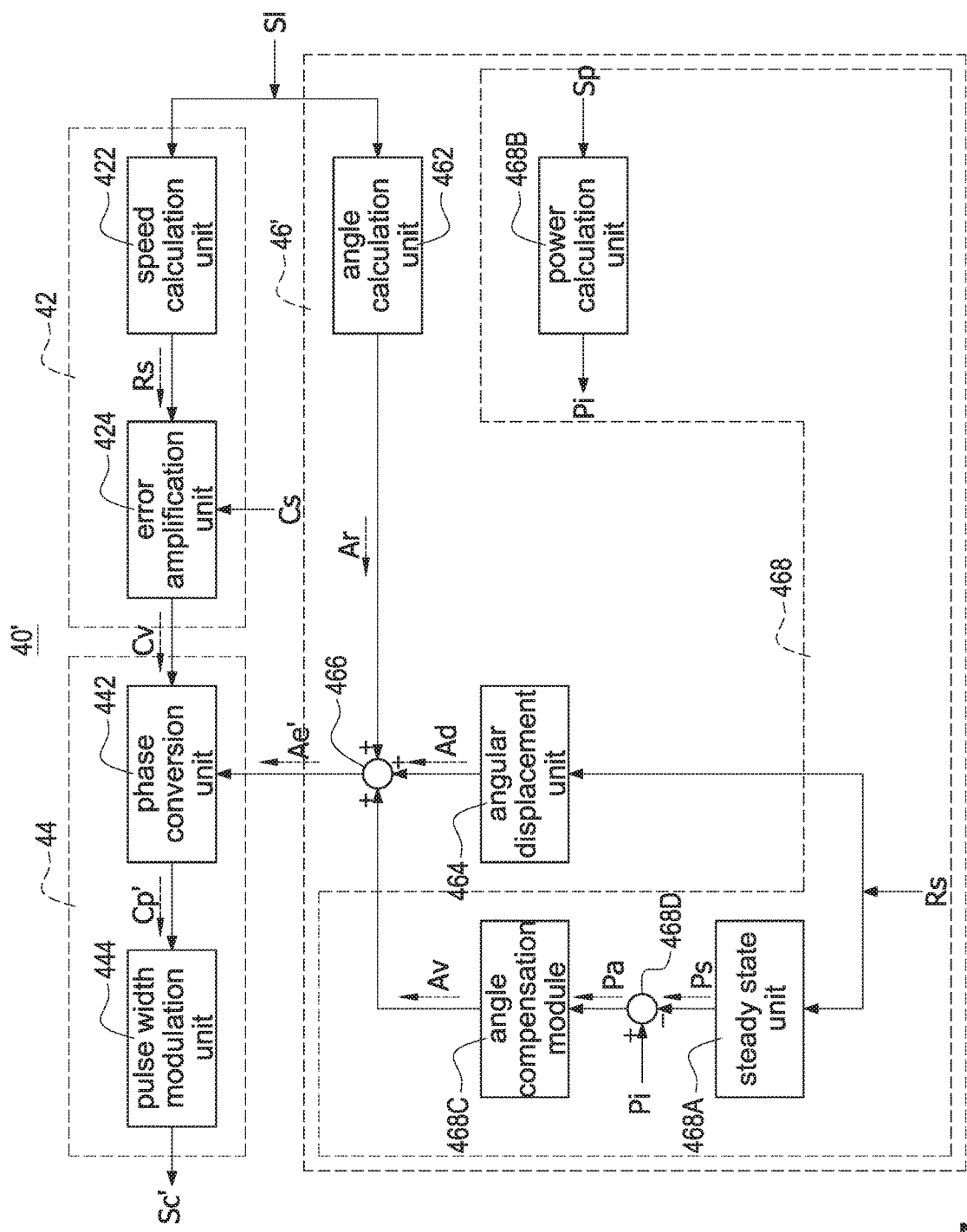
FIG. 7 shows a schematic circuit block diagram of the motor control module according to the second embodiment of the present invention.

Refer to FIG. 7, which shows a schematic circuit block diagram of the motor control module according to the second embodiment of the present invention. The major difference between the motor control module 40' in the second embodiment and the motor control module 40 in the first embodiment is that an angle generation module 46' includes an error compensation module 468. The error compensation module 468 is connected to the command generation module 42 and the adder 466. The error compensation module 468 receives the speed information Rs and the power signal Sp, converts the speed information Rs and the power signal Sp into an angle compensation amount Av, and transmits the angle compensation amount Av to the adder 466. The error compensation module 468 includes a steady state unit 468A, a power calculation unit 468B, an angle compensation module 468C, and a subtractor 468D. In particular, the connection relationship between the angle calculation unit 462 and the angular displacement unit 464 ion module 44 is identical to that in the first embodiment. In addition, the motor control module 40 can be implemented by the control chip or the physical circuit similar to the first embodiment.

Figure 8:
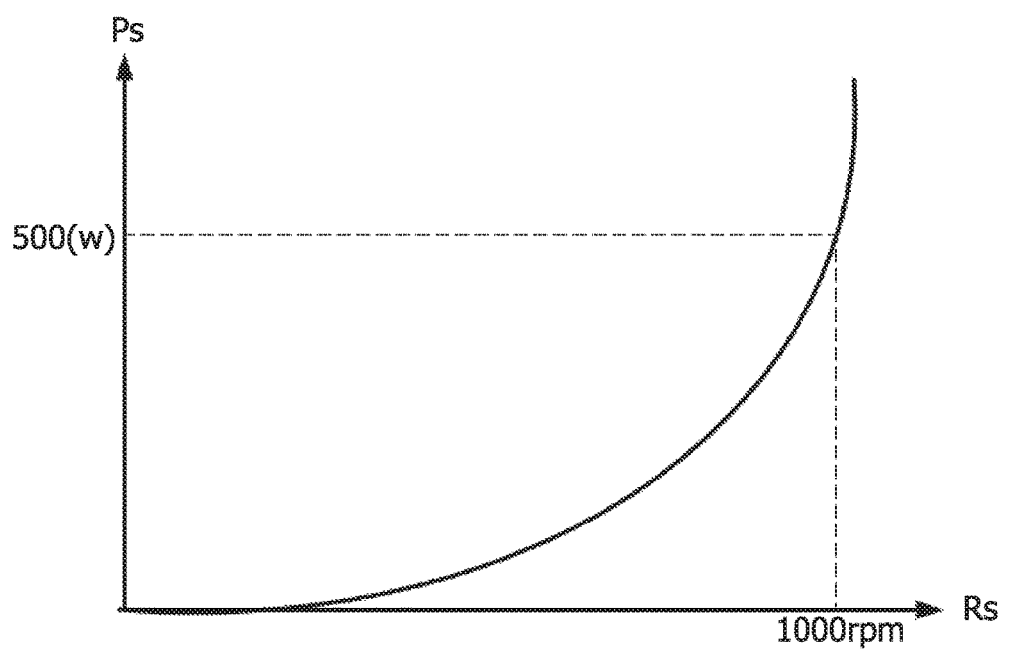
FIG. 8 shows a schematic chart of speed information versus a steady state power amount of the present invention.

With reference to FIG. 7, the steady state unit 468A has a speed-power curve chart shown in FIG. 8. In particular, the speed-power curve chart shows a relationship between the speed information versus a steady state power amount. The steady state unit 468A is connected to the command generation module 42 and the subtractor 468D, and receives the speed information Rs. The steady state unit 468A acquires a steady state power amount Ps corresponding to the speed information Rs according to the speed-power curve chart, and outputs the steady state power amount Ps to the subtractor 468D. One end of the power calculation unit 468B is connected to the drive module 20 through the power detection unit 48 and the other end of the power calculation unit 468B is connected to the subtractor 468D. The power calculation unit 468B receives the power signal Sp to calculate instantaneous power of the motor system 100' to acquire an instantaneous power amount Pi according to the power signal Sp, and outputs the instantaneous power amount Pi to the subtractor 468D. The subtractor 468D is connected to the steady state unit 468A, the power calculation unit 468B, and the angle compensation module 468C. The subtractor 468D is used to subtract the steady state power amount Ps from the instantaneous power amount Pi to provide a power error amount Pa, and the power error amount Pa is outputted to the angle compensation module 468C. The angle compensation module 468C has a power displacement chart shown in FIG. 9. In particular, the power displacement chart shows a relationship between a power difference versus an angle compensation amount Av. The angle compensation module 468C is connected to the subtractor 468D and the adder 466, and receives the power error amount Pa. The angle compensation module 468C acquires an angle compensation amount Av corresponding to the power error amount Pa according to the power displacement chart, and the angle compensation amount Av is outputted to the adder 466. The adder 466 receives the reference angle Ar, the angular displacement amount Ad, and the angle compensation amount Av, and composes the reference angle Ar, the angular displacement amount Ad, and the angle compensation amount Av into an electrical angle Ae'. In addition, the angle compensation amount Av is provided to compensate the angle displacement of the motor 60 due to the sudden acceleration, thus accurately acquiring the electrical angle Ae'. Accordingly, the accurate control signal Sc' is acquired to maintain the phase of the motor input voltage Vin of the motor 60 meeting the phase of the motor input current Iin of the motor 60 when the motor 60 suddenly accelerates, thus implementing PFC (power factor correction) and FOC (field oriented control) of the motor system 100.

Refer to FIG. 8, which shows a schematic chart of speed information versus a steady state power amount of the present invention. With reference to FIG. 6 and FIG. 7, the steady state unit 468A acquires the steady state power amount Ps corresponding to the speed information Rs according to the speed-power curve chart when the steady state unit 468A receives the speed information Rs. For example, when the speed information Rs is 1000 rpm, the steady state power amount Ps corresponding to the speed information Rs is 500 watts. In one embodiment, the steady state unit 468A has a memory unit (not shown) for storing the speed-power curve chart.

The speed-power curve chart shown in FIG. 8 indicates different steady state power amounts Ps corresponding to different speed values of the speed information Rs before the motor control module 40 is formally operated (namely in a test stage). More specifically, different steady state power amounts Ps relative to different loads (for example, different fans), which are driven by the motor 60 controlled by the motor control module 40', are acquired during the test stage. Therefore, the steady state power amount Ps can be acquired according to the speed of the motor 60 when the motor 60 is formally operated. In one embodiment, the memory unit (not shown) may be allocated inside the steady state unit 468A or outside and connected to the steady state unit 468A.

Figure 9:
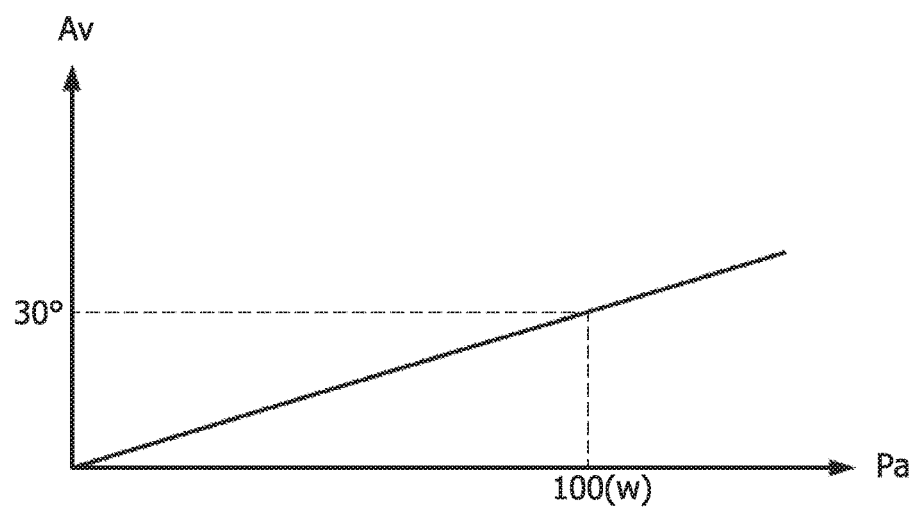
FIG. 9 shows a schematic chart of a sower error amount versus an angle compensation amount of the present invention.

Refer to FIG. 9, which shows a schematic chart of a sower error amount versus an angle compensation amount of the present invention. With reference to FIG. 6, FIG. 7, and FIG. 8, an instantaneous power is generated due to the sudden acceleration of the motor 60 when the motor 60 suddenly (instantaneously) accelerates. The power calculation unit 468B calculates the instantaneous power amount Pi generated from the motor 60. The subtractor 468D is used to subtract the steady state power amount Ps from the instantaneous power amount Pi to provide the power error amount Pa, and the power error amount Pa is outputted to the angle compensation module 468C. The angle compensation module 468C acquires the angle compensation amount Av corresponding to the power error amount Pa according to the power displacement chart. For example, when the power error amount Pa is 100 watts, the angle compensation amount Av corresponding to the power error amount Pa is 30 degrees. With reference also to FIG. 3, the angle compensation amount Av, such as 30 degrees is further provided to the adder 466 to acquire more accurate electrical angle Ae' rather than the electrical angle Ae. In one embodiment, the angle compensation module 468C has a memory unit (not shown) for storing the power displacement chart. The power displacement chart shown in FIG. 9 indicates different angle compensation amounts Av corresponding to different power error amounts Pa before the motor control module 40' is formally operated (namely in a test stage). When the motor control module 40' controls the motor 60 to accelerate, different power error amounts Pa are generated. More specifically, different angle compensation amounts Av relative to power error amounts Pa are acquired during the test stage. Therefore, the angle compensation amount Av can be acquired according to the power error amount Pa of the motor 60 when the motor 60 is formally operated. In one embodiment, the memory unit (not shown) may be allocated inside the angle compensation module 468C or outside and connected to the angle compensation module 468C.

In the two embodiments shown in FIG. 2 and FIG. 6, the drive module 20 is, for example but not limited to, a three-phase drive module having three bridge arms to drive a three-phase motor 60. Alternatively, the drive module 20 may be used to drive a single-phase motor. In addition, the motor 60 is, for example but not limited to, a permanent-magnet synchronous motor (PMSM). In other words, a motor, which can be controlled by the motor control module 40, 40', may be intended to be embraced within the scope of the present invention. Moreover, the position detection unit 62 used in the two above-mentioned embodiments is, for example but not limited to, a Hall sensor. In other words, a sensor, which can be used to detect the rotor position of the motor 60, may be intended to be embraced within the scope of the present invention.

Figure 10:
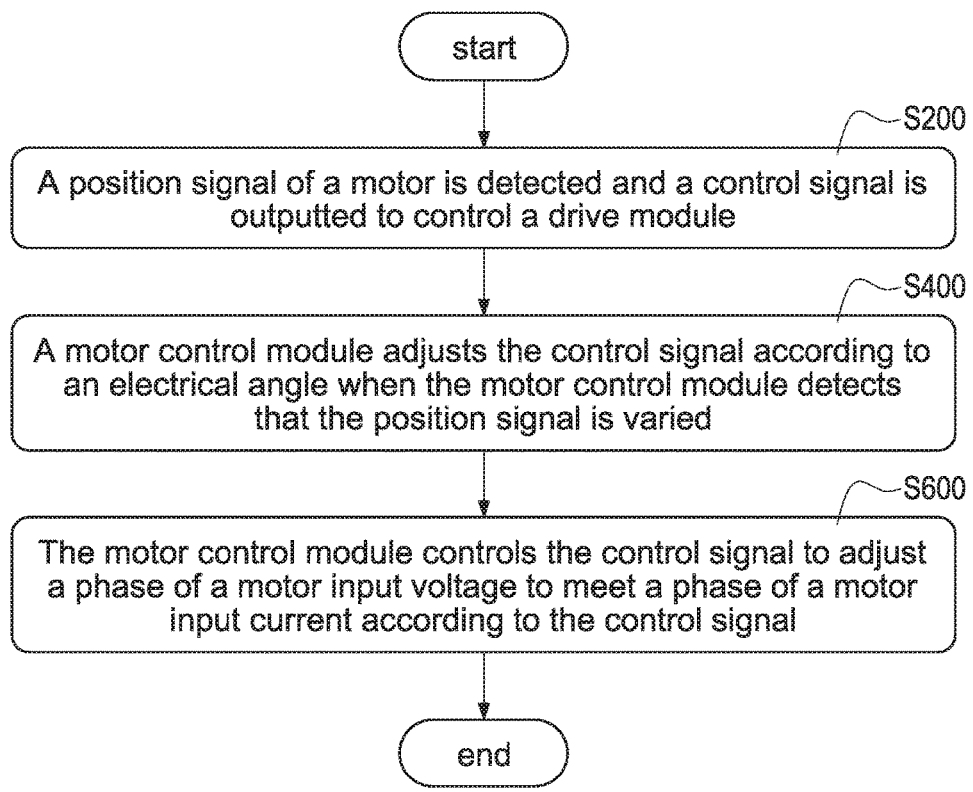
FIG. 10 shows a flowchart of a method of controlling a motor control module according to a first embodiment of the present invention.

Refer to FIG. 10, which shows a flowchart of a method of controlling a motor control module according to a first embodiment of the present invention. The motor system 100 includes a motor 60, a drive module 20, and a motor control module 40. The drive module 20 is electrically connected to the motor 60. The motor control module 40 is electrically connected to the motor 60 and the drive module 20, and controls rotation of the motor 60 through the drive module 20. The method includes steps as follows. First, a position signal of the motor is detected and a control signal is outputted to control the drive module (S200). The motor control module 40 detects the position signal Sl of the motor 60 and outputs the control signal Sc to the drive module 20 according to the position signal Sl. The drive module 20 receives an input power source Vs and the control signal Sc, and outputs a motor input voltage Vin to the motor 60 to control rotation of the motor 60. Afterward, the motor control module 40 adjusts the control signal Sc according to an electrical angle Ae when the motor control module 40 detects that the position signal Sc is varied (S400). When the motor control module 40 receives a speed command Cs and detects that the position signal Sl is varied, the motor control module 40 generates a reference angle Ar according to the position signal Sl. Afterward, an angular displacement amount Ad corresponding to the position signal Sl shown in FIG. 5 is acquired. The motor control module 40 composes the reference angle Ar and the angular displacement amount Ad into the electrical angle Ae. Afterward, the motor control module 40 outputs a voltage command Cv according to a difference between the speed command Cs and the position signal Sl, and adjusts and converts the voltage command Cv into the control signal Sc according to the electrical angle Ae. Finally, the motor control module 40 controls the control signal Sc to adjust a phase of the motor input voltage Vin to meet a phase of a motor input current Iin according to the control signal Sc (S600). The motor control module 40 adjusts and converts the voltage command Cv into the control signal Sc according to the electrical angle Ae, and outputs the control signal Sc to the drive module 20. The drive module 20 adjusts the phase of the motor input voltage Vin to meet the phase of the motor input current Iin according to the control signal Sc, thus implementing PFC (power factor correction) and FOC (field oriented control) of the motor system 100.

Figure 11:
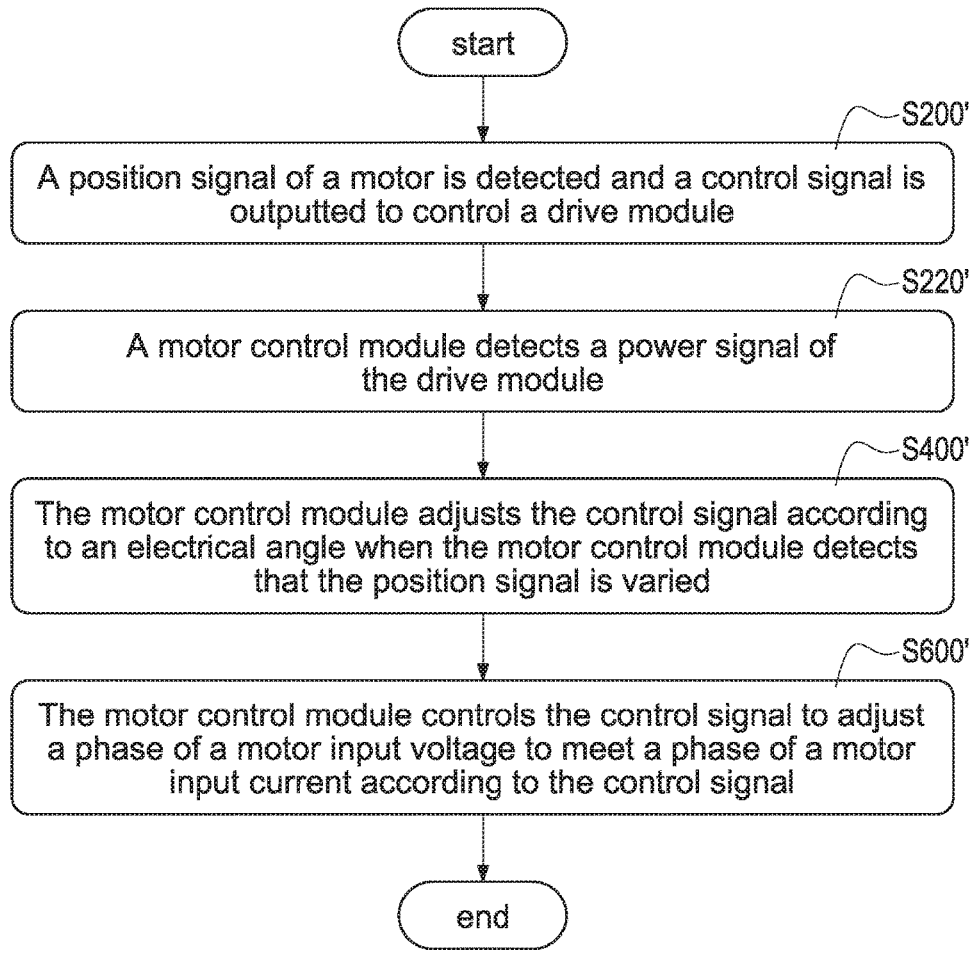
FIG. 11 shows a flowchart of a method of controlling the motor control module according to a second embodiment of the present invention.

Refer to FIG. 11, which shows a flowchart of a method of controlling the motor control module according to a second embodiment of the present invention. The major difference between the control method in the second embodiment and the control method in the first embodiment is that the latter further includes a step of "the motor control module 40' detects a power signal Sp of the drive module (S220')" after the step (S200'). The motor control module 40' further includes a power detection unit 48, and the power detection unit 48 detects the power signal Sp of the drive module 20 and transmits the power signal Sp to the motor control module 40'. The motor control module 40' acquires a steady state power amount Ps according to the position signal Sl according to a speed-power curve chart shown in FIG. 8. Afterward, the motor control module 40' acquires a power error amount Pa according to a difference between the steady state power amount Ps and the power signal Sp, and acquires an angle compensation amount Av corresponding to the power error amount Pa according to the power displacement chart shown in FIG. 9. Afterward, the motor control module 40' composes the reference angle Ar, the angular displacement amount Ad, and the angle compensation amount Av into an electrical angle Ae' through an adder 466. The motor control module 40' outputs the voltage command Cv according to a difference between the speed command Cs and the position signal Sl, and adjusts and converts the voltage command Cv into the control signal Sc' according to the electrical angle Ae'. In particular, the steps (S200'), (S400'), (S600') are identical to the steps (S200), (S400), (S600) in the first embodiment, respectively.

In conclusion, the present invention has the following advantages:

1. The reduction of the occupied hardware space and costs of the motor system can be implemented since no current detection units are required in the motor system;
2. The PFC (power factor correction) control and the FOC (field oriented control) can be implemented since the phase of the motor input voltage is adjusted according to different charts established in the motor control module by rules of experience; and
3. The accuracy of controlling the phase of the motor input voltage to meet the phase of the motor input current by the motor control module can be implemented since the power detection unit is used with the error compensation module.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A motor system with a current sensorless control, comprising:
   a motor;
   a drive module electrically connected to the motor; and
   a motor control module electrically connected to the motor and the drive module, and the motor control module configured to control the motor to rotate through the drive module; the motor control module comprising:
   a command generation module configured to receive a position signal and a speed command of the motor;
   a command conversion module connected to the command generation module, and the command conversion module configured to output a control signal to the drive module; and
   an angle generation module connected to the command generation module and the command conversion module, and the angle generation module configured to receive the position signal, the angle generation module comprising:
   an angle calculation unit configured to receive position information; and
   an angular displacement unit configured to receive speed information;
   wherein the command generation module is configured to generate the speed information according to the position signal and transmit the speed information to the angle generation module, and the command generation module is configured to generate a voltage command according to the position signal and the speed command and transmit the voltage command to the command conversion module; the angle calculation unit is configured to generate a reference angle according to the position information; the angular displacement unit is configured to acquire an angular displacement amount corresponding to the speed information according to an angular displacement chart; the angle generation module is configured to compose the reference angle and the angular displacement amount into an electrical angle; the command conversion module is configured to convert the voltage command and the electrical angle into the control signal; the motor control module is configured to adjust a phase of a motor input voltage to meet a phase of a motor input current according to the control signal.

2. The motor system in claim 1, wherein the angle generation module further comprises:
an adder connected to the angle calculation unit, the angular displacement unit, and the command conversion module, and the adder configured to add the reference angle and the angular displacement amount so that the electrical angle is composed.

3. The motor system in claim 1, wherein the command generation module comprises:
a speed calculation unit configured to receive the position signal of the motor; and
an error amplification unit connected to the speed calculation unit and the command conversion module;
wherein the speed calculation unit is configured to convert the position signal into the speed information; the error amplification unit is configured to amplify a difference between the speed information and the speed command into the voltage command.

4. The motor system in claim 1, wherein the command conversion module comprises:
a phase conversion unit is configured to receive the voltage command and the electrical angle; and
a pulse width modulation unit connected to the phase conversion unit and the drive module;
wherein the phase conversion unit is configured to adjust the voltage command into a phase command according to the electrical angle; the pulse width modulation unit is configured to convert the phase command into the control signal.

5. A motor system with a current sensorless control, comprising:
a motor;
a drive module electrically connected to the motor; and
a motor control module electrically connected to the motor and the drive module, and the motor control module configured to control the motor to rotate through the drive module; the motor control module comprising:
a command generation module configured to receive a position signal and a speed command of the motor;
a command conversion module connected to the command generation module, and the command conversion module configured to output a control signal to the drive module;
an angle generation module connected to the command generation module and the command conversion module, and the angle generation module configured to receive the position signal, the angle generation module comprising:
an angle calculation unit configured to receive position information;
an angular displacement unit configured to receive speed information; and
an error compensation module configured to receive the speed information and a power signal; and
a power detection unit configured to detect the power signal of the drive module to the angle generation module;
wherein the command generation module is configured to generate the speed information according to the position signal and transmit the speed information to the angle generation module, and the command generation module is configured to generate a voltage command according to the position signal and the speed command and transmit the voltage command to the command conversion module; the angle calculation unit is configured to generate a reference angle according to the position information; the angular displacement unit is configured to acquire an angular displacement amount corresponding to the speed information according to an angular displacement chart; the error compensation module is configured to output an angle compensation amount according to the power signal and the speed information; the angle generation module is configured to compose the reference angle, the angular displacement amount, and the angle compensation amount into an electrical angle; the command conversion module is configured to convert the voltage command and the electrical angle into the control signal; the motor control module is configured to adjust a phase of a motor input voltage to meet a phase of a motor input current according to the control signal.

6. The motor system in claim 5, wherein the angle generation module further comprises:
an adder connected to the angle calculation unit, the angular displacement unit, the error compensation module, and the command conversion module, and the adder configured to add the reference angle, the angular displacement amount, and the angle compensation amount so that the electrical angle is composed.

7. The motor system in claim 5, wherein the error compensation module comprises:
a steady state unit configured to receive the speed information;
a power calculation unit configured to receive the power signal; and
an angle compensation unit connected to the steady state unit and the power calculation unit;
wherein the steady state unit is configured to acquire a steady state power amount corresponding to the speed information according to a speed-power curve chart; the power calculation unit is configured to convert the power signal into an instantaneous power amount; the error compensation module is configured to acquire a power error amount according to a difference between the steady state power amount and the instantaneous power amount; the angle compensation unit is configured to acquire the angle compensation amount corresponding to the power error amount according to a power displacement chart.

8. The motor system in claim 7, wherein the error compensation module further comprises:
a subtractor connected to the steady state unit, the power calculation unit, and the angle compensation unit, and the subtractor is configured to subtract the steady state power amount from the instantaneous power amount to provide the power error amount.

9. The motor system in claim 5, wherein the command generation module comprises:

a speed calculation unit configured to receive the position signal of the motor; and an error amplification unit connected to the speed calculation unit and the command conversion module;

wherein the speed calculation unit is configured to convert the position signal into the speed information; the error amplification unit is configured to amplify a difference between the speed information and the speed command into the voltage command.

10. The motor system in claim 5, wherein the command conversion module comprises:

a phase conversion unit is configured to receive the voltage command and the electrical angle; and a pulse width modulation unit connected to the phase conversion unit and the drive module;

wherein the phase conversion unit is configured to adjust the voltage command into a phase command according to the electrical angle; the pulse width modulation unit is configured to convert the phase command into the control signal.

11. A method of controlling a motor system with a current sensorless control, the motor system comprising a motor, a drive module, and a motor control module electrically connected to the motor and the drive module, and the motor control module configured to control the motor to rotate through the drive module, the method comprising steps of:

(a) detecting a position signal of the motor by the motor control module and outputting a control signal to control the drive module;

(b) outputting a voltage command from the motor control module according to a difference between the position signal and the speed command and adjusting the voltage command into the control signal according to an electrical angle by the motor control module when the motor control module is configured to receive a speed command and detect that the position signal is varied; and (c) adjusting a phase of a motor input voltage to meet a phase of a motor input current according to the control signal by the motor control module.

12. The method of controlling the motor system in claim 11, wherein the step (b) further comprises a step of:

(b1) generating a reference angle according to the position signal by the motor control module, acquiring an angular displacement amount corresponding to the position signal according to an angular displacement chart, and composing the reference angle and the angular displacement amount into the electrical angle.

13. The method of controlling the motor system in claim 11, wherein the step (a) further comprises a step of:

(a1) detecting a power signal of the drive module by the motor control module.

14. The method of controlling the motor system in claim 13, wherein the step (b) further comprises a step of:

(b2) generating a reference angle according to the position signal by the motor control module, acquiring an angular displacement amount corresponding to the position signal according to an angular displacement chart, and acquiring a steady state power amount corresponding to the speed information according to a speed-power curve chart.

15. The method of controlling the motor system in claim 14, wherein the step (b2) further comprises a step of:

(b3) acquiring a power error amount by the motor control module according to a difference between the steady state power amount and the power signal, acquiring an angle compensation amount corresponding to the power error amount according to a power displacement chart, and composing the reference angle, the angular displacement amount, and the angle compensation amount into the electrical angle.

* * * * *